V. ROYLE.
DIMENSIONING GAGE FOR LINOTYPE SLUG CUTTERS.
APPLICATION FILED APR. 8, 1915.
1,375,323.
Patented Apr. 19, 1921.
2 SHEETS—SHEET 2.
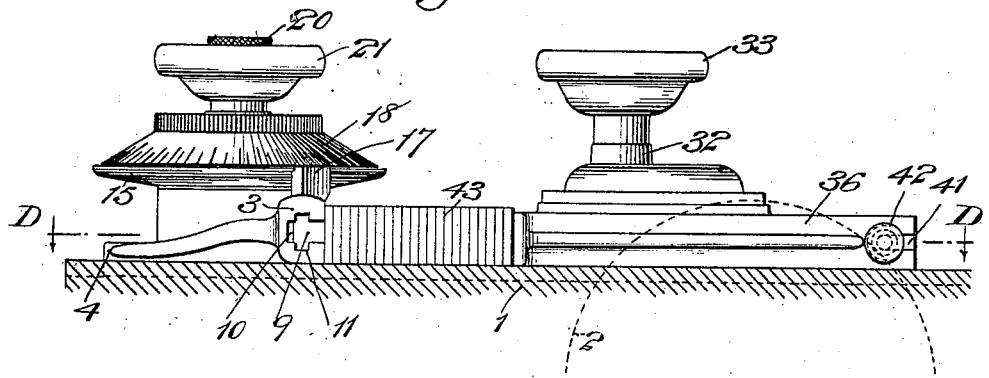
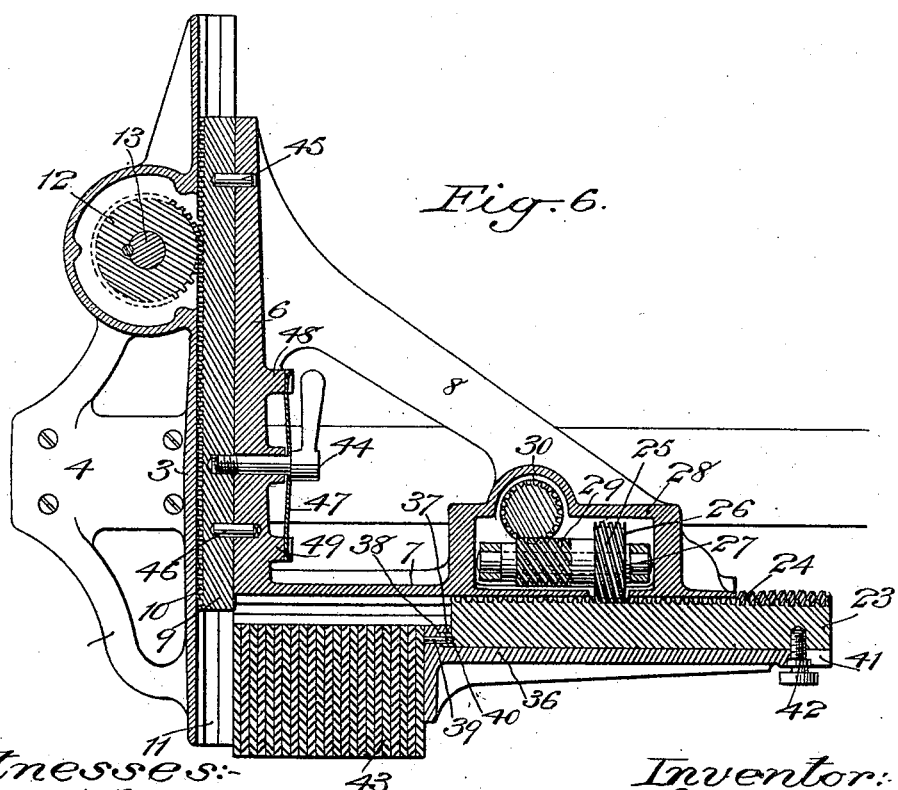

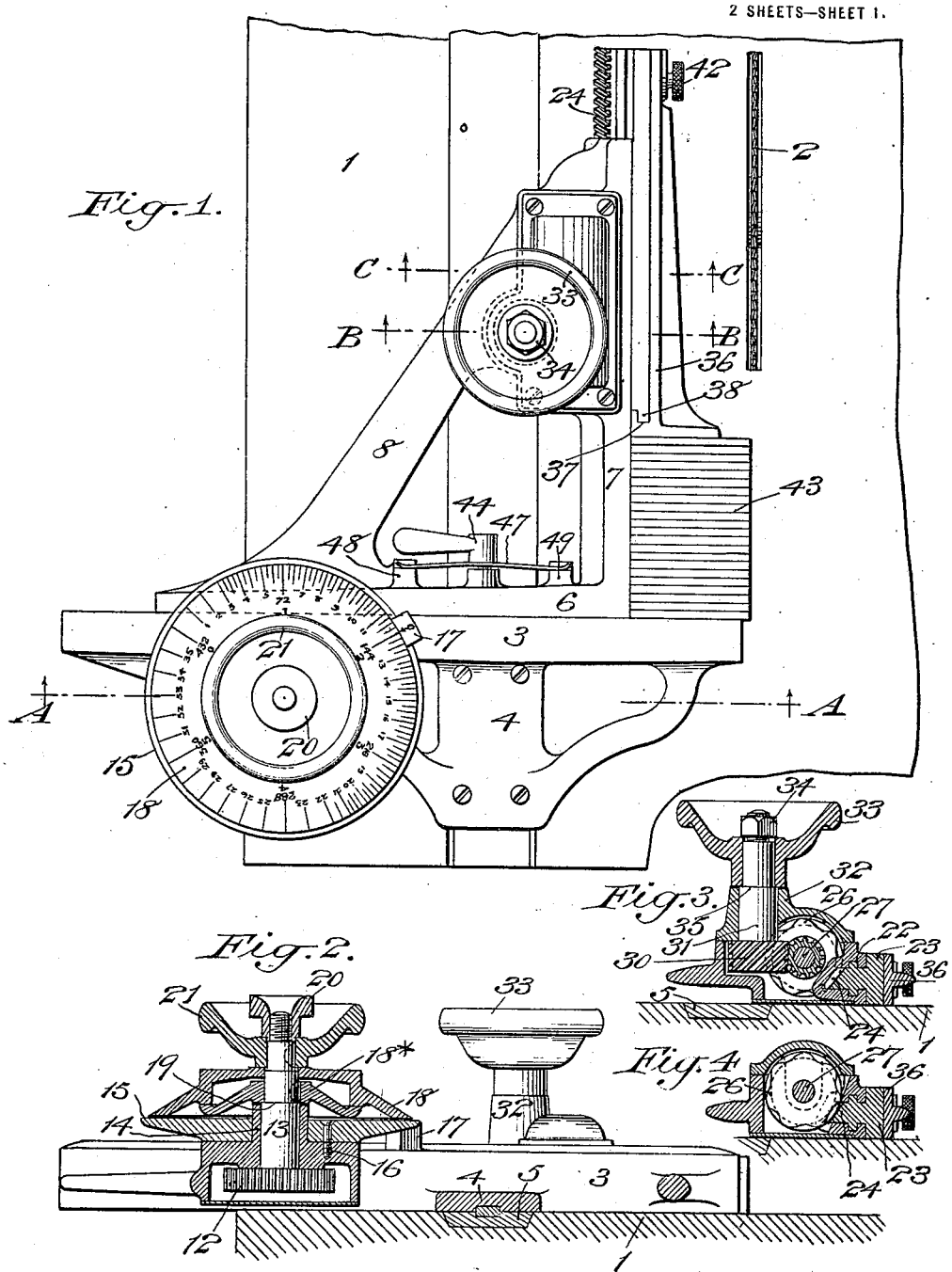

UNITED STATES PATENT OFFICE.

VERNON ROYLE, OF PATERSON, NEW JERSEY.

DIMENSIONING-GAGE FOR LINOTYPE-SLUG CUTTERS.

1,375,323.      Specification of Letters Patent.      Patented Apr. 19, 1921.

Application filed April 8, 1915. Serial No. 19,996.

*To all whom it may concern:*

Be it known that I, VERNON ROYLE, a citizen of the United States, and resident of Paterson, in the county of Passaic and State of New Jersey, have invented a new and useful Improvement in Dimensioning-Gages for Linotype-Slug Cutters, of which the following is a specification.

My invention relates to a dimensioning gage for linotype slug cutters, with the object in view of providing efficient and time saving means for accurately cutting type slugs for printing purposes.

In the accompanying drawings,

Figure 1 is a top plan view of the gage applied to a table having a saw located therein.

Fig. 2 is a transverse section in the plane of the line A—A, Fig. 1.

Fig. 3 is a transverse section in the plane of the line B—B, Fig. 1.

Fig. 4 is a transverse section in the plane of the line C—C, Fig. 1.

Fig. 5 is a side elevation of the gage, the table on which it is located being shown in section and the saw indicated by dotted lines, and Fig. 6 is a horizontal section in the plane of the line D—D, Fig. 5.

The table shown may be of any approved or suitable construction for receiving the gage and permitting it to slide bodily in a direction to present the work to a cutter and the cutter, here shown as a saw, may be of any well known or approved type, either saw or blade. The table is denoted by 1 and the cutter by 2.

The frame of the gage consists of a bar denoted by 3, and a reinforcing bracket portion 4 to which is secured the guide 5, for directing the gage bodily along the table to present the work to the cutter.

A knee or angle frame consisting of the legs 6 and 7 and the diagonal brace 8 connecting the two legs, is constructed to slide along the face of the bar 3, in proximity to the top of the table, in a right line toward and away from the path of the cutter. The leg 6 and hence the knee frame, is removably secured to a T-shaped tongue 9, the outer face of which is provided with a series of rack teeth 10. The tongue 9 is received with a sliding fit in an undercut groove 11 in the face of the bar 3. For purposes which will hereinafter appear, the teeth 10 are cut in harmony with printers' points, that is, a series of teeth of a certain length, for example, a series six inches in length, can be expressed in printers' points, so that when a micrometer, hereinafter described, is subdivided in accordance with a printer's point as a standard, the movement of the tongue 9 and knee or angle frame may be measured in printers' points.

The knee frame is operated by a pinion 12, keyed to an upright shaft 13, journaled in a hub piece 14, rigid with the bar 3 and bracket 4. Surrounding a reduced upper portion of the hub piece 14, is a disk plate 15, locked to the hub piece 14 by a screw 16, the head of which is countersunk in the upper face of the plate 15, the said screw being tapped into the hub piece 14. At a point in the periphery of the plate 15, there is a flat top post 17, extending from the bar 3 to the upper face of the plate and projecting outward a short distance to readily catch the eye of the operator and on the top of this post is a fine line to indicate the starting point for setting the gage.

An indicating dial, here shown as a micrometer disk 18, in the present instance cone-shaped along its outer portion, is mounted on the shaft 13, its outer edge extending down into proximity to the face of the plate 15 and subdivided into equal parts taking the distance of a printer's point as a standard. As shown on the drawings, the smallest subdivision corresponds to three points, the next larger to six points, the next larger to twelve points or a pica and the largest to seventy two points or six picas, of which there are six in the entire circumference. These groups of seventy-two each are further noted by figures 0, 1, 2, 3, 4, 5, on the margin of the flattened central portion of the micrometer disk 18. The micrometer disk 18, together with the indicated starting or zero point form what I am pleased to call the measuring device. The disk 18, may be clamped to the shaft 13, by the pressure of a thumb nut 20 on a hand wheel 21 which in turn rests on the disk 18. To give the central portion of the disk 18 an advantageous friction bearing, there is provided a bearing piece 18*, keyed to the shaft 13, on the rim of which piece the disk 18 bears, the central portion of the disk 18* resting on a shoulder 19 on the shaft 13.

When the parts, disk 18 and hand wheel 21, are locked to the shaft 13 by the nut 20, they rotate with the shaft as the latter is operated to rotate the pinion 12 and hence slide the knee, but when the nut 20 is loosened, the disk 18 may be rotated independently of the shaft and pinion and this feature is of importance as follows: If a cutter after sharpening or when exchanged for another, cuts in a path a slight distance farther from the face of the gage than a previous cutter, the gage may be quickly and accurately adjusted to indicate points by running the knee frame out until its front face touches the cutter blade or saw tooth and then setting the micrometer 18 with its zero at the fine line on the post 17 and then clamping the parts to the shaft 13 and turning the micrometer and shaft to set the knee frame back the required number of points for the particular slugs to be cut.

The leg 7 of the knee frame has an undercut groove 22 in its face in which a jaw carrying bar 23 slides. The bar 23 has a series of spiral teeth 24 on its back, which teeth are engaged by the spiral thread 25 on a pinion 26 carried by a short shaft 27 mounted in a housing 28 rigid with the knee frame. The shaft 27 also carries a spiral gear 29 engaged by a spiral toothed actuating wheel 30 on an upright shaft 31 hung in a bearing 32 extending upwardly from the housing 28 and operated by a hand wheel 33 clamped to the shaft by a nut 34. The wheel 33 is forced by the nut 34 against a shoulder 35 on the shaft and the bottom of the wheel hub rests on the top of the bearing 32 to suspend the shaft and its wheel.

The pitch of the several spiral gears 30, 29, 25, and teeth 24 is such that the friction will be sufficient to hold the jaw carrying bar 23 in its adjusted position without any other locking device.

The bar 23 slides in a right line toward and away from the bar 3, and is fitted to receive interchangeable clamping jaws 36, one only being shown, it being understood that others of similar construction, having a longer or shorter slug engaging end, might be employed. The inner end of the bar 23 is provided with a tongue 37 to enter a groove 38 in the back of the slug engaging end of the bar 23, to lock that end of the jaw against horizontal displacement, and a pin 39 projecting from the bottom of the groove 38, enters a hole 40 in the tongue 37 to lock the end against vertical displacement. The outer end of the jaw 36 is provided with an open slot 41 to receive a clamp screw 42 tapped into the front face of the bar. Jaws may be interchanged by simply loosening the screw 42 and sliding the jaw along the face of the bar 23 to free its inner end, and reversing this operation to place another jaw in position, it being understood that the group of slugs 43 shown in the drawings are not in position to be cut when the interchange of jaws takes place.

To lock the knee frame and parts carried thereby to the sliding tongue 9, and the tongue 9 and knee to the bar 3, a tail screw 44 extends through the leg 6 of the knee frame and screws into the tongue 9, and two dowel pins 45, 46, coact with the screw 44 to maintain the alinement. By tightening the screw, the tongue and face of the leg 6 are caused to grip the bar 3. A bar spring 47 surrounding the screw 44 under its head and with its free ends bearing on bosses 48, 49, on the back of the leg 6, tends to close the joint between the leg 6 and face of the bar 3, when the screw 44 is loosened to adjust the knee, holding the knee in mild frictional engagement with the bar 3 and preventing the entrance of chips to disturb the accuracy of the gage. Instead of the micrometer disk 18 divided into subdivisions with a printing point as the standard, disks subdivided by taking any other well known or desired standard might be substituted without changing the structure other than the marks of subdivision, to fit the gages for the particular work to be performed.

In operation, the disk 18 having been loosened from the shaft 13 and the knee frame slid forward until its face touches the cutter, the disk 18 is then turned independently of the shaft 13, until its zero point registers with the fine line on the top of the post 17. The micrometer disk 18 is then locked to the shaft 13 and the disk, together with the shaft, is then turned to slide the knee frame back seventy-two printers' points, if that be the length of the slugs desired, or one hundred forty four points, as shown in the drawings, if that be the length required, or any other desired number of points within the limits of the gage. A group of the slugs is then placed in position as shown at 43, the back of the group resting against the front of the gage and one end of the group against the frame 3. The clamping jaw 36 is then slid against the opposite end of the group by turning the wheel 33, and when tightly held, the gage is slid along the table 1, to bring the cutter 2 into engagement to cut the slugs the desired length.

What I claim is:

1. In a gage, the combination with a supporting frame and a knee frame arranged to slide along the supporting frame, of a screw for locking the frames in the desired adjustment and a spring arranged to coact with the screw to hold the frames in contact when the screw is loosened.

2. A gage comprising a supporting frame, a knee frame arranged to slide along the supporting frame, a clamp carried by the knee frame, a jaw of the clamp being provided with an offset at one end and a slot at the opposite end, a jaw support being provided with a shoulder to receive said offset end of the jaw, the said shoulder and jaw being provided the one with a recess and the other with a projection to enter the recess for removably securing one end of the jaw and means coacting with said slot to secure the opposite end of the jaw.

3. A gage comprising a supporting frame, a movable frame arranged to slide along the supporting frame, a clamp arranged to slide along the movable frame, a hand wheel and means intermediate the hand wheel and clamp for placing the clamp under the control of the hand wheel.

In testimony, that I claim the foregoing as my invention, I have signed my name in presence of two witnesses, this fifth day of April, 1915.

VERNON ROYLE.

Witnesses:
HEBER ROYLE,
F. J. BRADLEY.